United States Patent [19]

Abukawa et al.

[11] Patent Number: 4,703,210
[45] Date of Patent: Oct. 27, 1987

[54] MINIATURE ELECTRIC NON-UNIFORM MAGNETIZATION ROTATING MACHINE

[75] Inventors: Toshimi Abukawa, Hitachi-Oota; Kazuo Tahara; Noriyoshi Takahashi, both of Hitachi; Toshio Tomite, Katsuta, all of Japan

[73] Assignee: Hitachi, Ltd., Tokyo, Japan

[21] Appl. No.: 905,158

[22] Filed: Sep. 9, 1986

[30] Foreign Application Priority Data

Sep. 18, 1985 [JP] Japan ............................ 60-204280

[51] Int. Cl.$^4$ ...................... H02K 1/06; H02K 21/26
[52] U.S. Cl. .................................. 310/154; 310/42; 335/284
[58] Field of Search ............ 310/40 MM, 153, 154, 310/156, 254, 42; 335/284

[56] References Cited

U.S. PATENT DOCUMENTS

| | | | |
|---|---|---|---|
| 3,469,129 | 9/1969 | Humphreys | 310/154 |
| 3,939,371 | 2/1976 | Murakami | 310/154 |
| 4,237,397 | 12/1980 | Mohr et al. | 310/154 |
| 4,471,252 | 9/1984 | West | 310/154 |

FOREIGN PATENT DOCUMENTS 2205219  8/1973  Fed. Rep. of Germany ...... 310/154

*Primary Examiner*—Patrick R. Salce
*Assistant Examiner*—D. L. Rebsch
*Attorney, Agent, or Firm*—Antonelli, Terry & Wands

[57] ABSTRACT

A miniature electric rotating machine has a stator equipped with a field pole on a peripheral circle of a rotor, and the field pole is constituted by a permanent magnet. Each permanent magnet of a miniature electric rotating machine of this type can be divided into a magnetizing side and a demagnetizing side with respect to armature reaction. In the permanent magnet of the present invention, an end portion on the demagnetizing side, which has directivity different from the magnetizing directions on the magnetizing and demagnetizing sides, is disposed adjacent to the portion on the demagnetizing side.

4 Claims, 11 Drawing Figures

POSITION OF PERIPHERAL
DIRECTION OF
PERMANENT MAGNET

MINIATURE ELECTRIC NON-UNIFORM MAGNETIZATION ROTATING MACHINE

BACKGROUND OF THE INVENTION

1. Field of the Invention

This invention relates generally to a miniature electric rotating machine, and more particularly to a permanent magnet field system to be adopted to a rotating machine of a permanent magnet field system, or to an electric rotating machine of a permanent magnet field system equipped with auxiliary poles of the type in which a field pole is constituted by a permanent magnet and auxiliary poles of a magnetic material.

2. Description of the Prior Art

Permanent magnet field system DC machines using a permanent magnet for poles are known in the art. The permanent magnet used for DC machines of this type has generally an arc shape and the magnet is an anisotropic magnet. The permanent magnet is magnetized by a magnetizer such as that disclosed in Japanese Patent Laid-Open No. 43167/1983 entitled "Magnetizer of Field System Aggregate" which was laid open on Mar. 12, 1983. The magnet is magnetized in anisotropic directions substantially towards the center in a radial direction. Therefore, a problem occurs that when the magnetic flux of armature reaction due to an armature current acts, the permanent magnet disposed on a demagnetizing side is demagnetized. This means that the thickness of the permanent magnet must be increased.

SUMMARY OF THE INVENTION

It is therefore an object of the present invention to provide a miniature electric rotating machine which can reduce the thickness of a permanent magnet for a field system.

The present invention provides for the magnetizing direction at the end portion on the demagnetizing side of the permanent magnet for a field system of a miniature electric rotating machine to be different from other portions on the demagnetizing side and portions on the magnetizing side. This arrangement can offset the reaction magnetic flux due to an armature reaction in the proximity of the end portion on the demagnetizing side, as will be described subsequently so that the thickness of the permanent magnet for a field system for offsetting the armature reaction in the magnetizing direction can be reduced.

DESCRIPTION OF THE PREFERRED EMBODIMENTS

Figure 1:
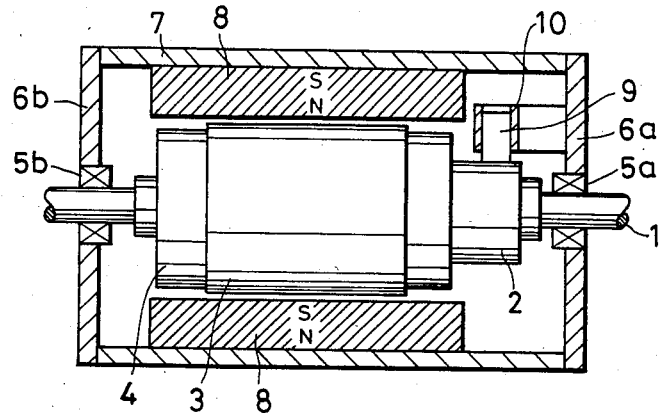
FIG. 1 is a partial sectional view of a permanent magnet field system rotating machine in an axial direction in accordance with the present invention.

FIG. 1 is a sectional view, in an axial direction, of a two-pole permanent magnet field system electric machine. In the drawing, a rotor consisting of a shaft 1, a commutator 2 and an armature formed by winding a winding 4 on an armature core 3 are supported by end brackets 6a, 6b on a fixing side through bearings 5a, 5b, respectively. These end brackets are fixed to a cylindrical yoke 7. Two permanent magnets 8 respectively having an arc shape are disposed equidistantly on the inner periphery of the yoke 7 and are fixed with an adhesive, or the like. Reference numeral 9 represents a brush, which is fixed to the bracket 6a through a brush holder 10.

Figure 2:
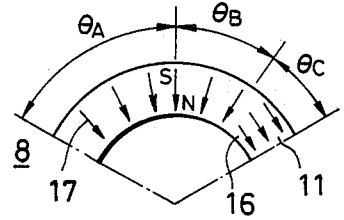
FIG. 2 is a sectional view of the permanent magnet in a radial direction in accordance with one embodiment of the present invention.
Figure 3:
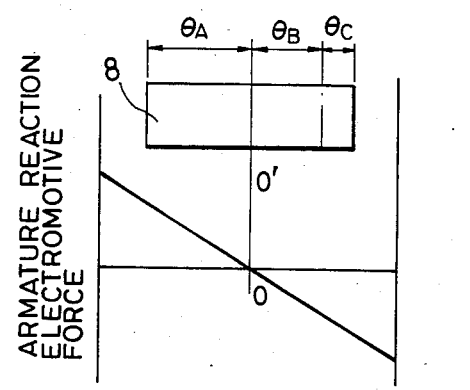
FIG. 3 is a diagram showing the relation between an armature reaction electromotive force and a position in a peripheral direction of the permanent magnet.

In the electric machine described above, the permanent magnet 8 is a ferrite type anisotropic permanent magnet and has an arc shape. As shown in FIG. 2 which is a sectional view in a radial direction, this permanent magnet 8 is produced in such a fashion that its anisotropic direction varies depending upon a peripheral position. In other words, the anisotropic direction of the permanent magnet extends towards the center axis of the armature core 3 from the portion $\theta_A$ on the magnetizing side, where the armature reaction acts in the magnetizing direction, to the portion $\theta_B$ on the demagnetizing side from the center of magnetism 0—0' where the armature reaction acts in the demagnetizing direction, as shown in FIG. 3. However, the present invention is not limited to the above, in particular. Namely, the present invention also considers the arrangement in which the magnetizing directions of the portions on the magnetizing and demagnetizing sides extend towards the center of the armature core such as the arrangement where the magnetizing directions are parallel to each other. On the other hand, at the portion $\theta_C$ near the end portion on the demagnetizing side, the anisotropic direction is substantially at right angles to the surface of the end portion 11 on the demagnetizing side.

Figure 6:
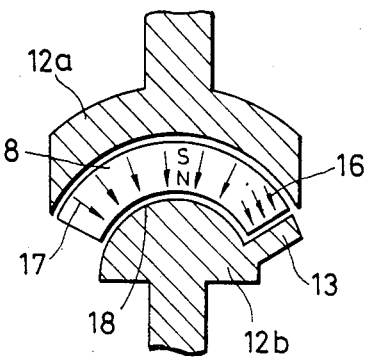
FIG. 6 is a sectional view useful for explaining a magnetizer used for magnetizing the permanent magnet in the present invention.

The anisotropic permanent magnet having these two directions can be produced by compression-molding a magnetic material, and causing a magnetic field to act upon the mold by use of a magnetizer such as shown in FIG. 6 so as to provide the magnet with anisotropy.

Turning back to FIG. 1, when a current flows through the armature coil in the electric machine, the armature reaction takes place. The armature reaction electromotive force acts as the magnetizing force on the left side from the center of magnetism 0—0' of the permanent magnet, and as the demagnetizing force, that is in a direction which reduces the flux of the permanent magnet, on the right side from the center of magnetism 0—0'. Particularly, the demagnetizing force acting upon the permanent magnet 8 is great at the end portion 11.

Figure 4:
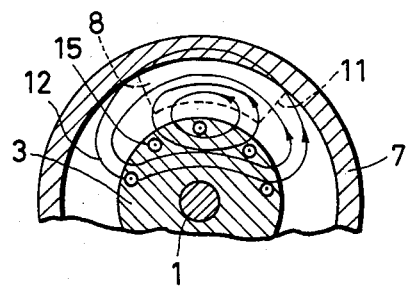
FIG. 4 is a diagram showing the distribution of the magnetic flux of the armature reaction in a state where the permanent magnet is not fitted.
Figure 5:
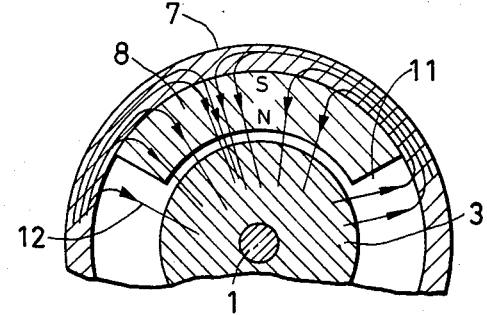
FIG. 5 is a diagram showing the distribution of the reaction magnetic flux due to the armature reaction when the present invention is applied.

In FIG. 4, when a current flows through the armature coil 15 in a direction out of the drawing, the flux 12 due to the armature reaction is incident substantially orthogonally to the end portion 11 on the demagnetizing side of the permanent magnet 8 if the permanent magnet 8 is disposed. If the permanent magnet 8 in accordance with the present invention is used, it can offset the reaction flux which is incident in such a direction as described above by the flux in the anisotropic direction 16 which crosses at right angles the end portion 11 on the demagnetizing side. This offsetting mode is depicted in FIG. 5, and the reaction flux 12 due to the armature reaction cannot be incident to the end portion 11 on the demagnetizing side.

In FIG. 6, the yoke consists of an external yoke 12a and an internal yoke 12b having a projection 13, and both of these yokes cover the permanent magnet 8. The projection 13 extends in a radial direction in such a manner as to cover the end portion 11 on the demagnetizing side of the permanent magnet 11. When the permanent magnet 8 is magnetized by the use of such a magnetizer in accordance with the magnetization method described in Japanese Patent Laid-Open No. 43167/1983, the flux passes from the external yoke towards the projection 13 of the internal yoke so that the portion near the end portion 11 of the permanent magnet 8 is magnetized in a substantially orthogonal direction 16. On the other hand, the remaining portions, other than the portion near the end portion 11 on the demagnetizing side, are magnetized towards the center in the radial direction as represented by reference numeral 17.

Incidentally, when the magnetizing direction of the permanent magnet 8 is not in the center direction of the armature core, such as when all the magnetizing directions of the portions on both the magnetizing and demagnetizing sides are not parallel to one another, the curved portion 18 shown in FIG. 6 of the internal yoke 12b may be made flat.

In the electric machine using the permanent magnet magnetized in the manner described above, even when the reaction flux due to the armature reaction is about to be incident to the end portion 11 on the demagnetizing side of the permanent magnet 8, the anisotropic direction near the end portion of the permanent magnet 8 impinges against the reaction flux 12 and hence the reaction flux is offset. Accordingly, demagnetization near the end portion of the permanent magnet 8 can be prevented and demagnetization resistance of the permanent magnet can be improved. Moreover, since demagnetization reaction is improved, the thickness of the permanent magnet can be reduced.

Next, another embodiment of the invention will be described.

Though the present invention deals with a two-pole machine by way of example, it can be applied to multiple-pole machines such as a four-pole or six-pole machine. Though the invention deals with the D.C. electric rotating machine by way of example, it can be applied similarly effectively to rotating machines, so long as they use a permanent magnet. Furthermore, though the embodiment described above uses the ferrite type permanent magnet by way of example, the effect of the invention remains the same so long as the permanent magnet is an anisotropic magnet such as a rare earth magnet, plastic magnet, rubber magnet, alnico magnet, or the like.

Referring to FIG. 2, though the direction of anisotropy of the portion $\theta_C$ on the demagnetizing side of the permanent magnet 8 is substantially at right angles to the line on the end portion 11 on the demagnetizing side, the angle need not always be right angles but may be an acute or obtuse angle. In other words, the direction of anisotropy may be determined, depending upon the incident direction of the reaction flux due to the armature reaction of a rotating machine of each type in order to obtain the maximum effect. The angle $\theta_C$ of the portion of the demagnetizing side of the permanent magnet 8 may be determined, depending upon the model of the rotating machine, while taking into consideration which of the generation flux quantity and demagnetization resistance is to be emphasized.

In FIG. 6, magnetization is effected before the permanent magnet 8 is assembled. However, if magnetization is made by the use of an internal yoke having one projection for one pole while the permanent magnet is assembled in the yoke, an anisotropic permanent magnet can be obtained simultaneously in a multiple-pole machine as shown in FIG. 2.

Figure 7:
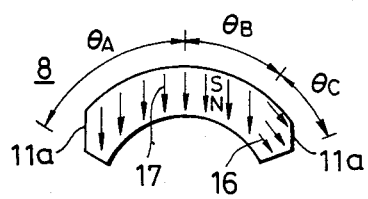
FIGS. 7, 8, 9, 10 and 11 show other embodiments of the present invention.
Figure 9:
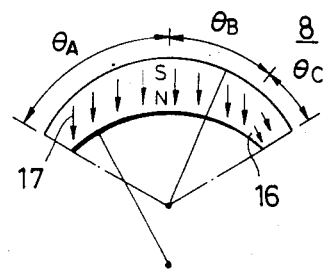
Figure 8:
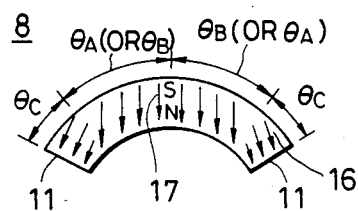

The end portion 11 on the demagnetizing side of the permanent magnet 8 having the shapes such as shown in FIGS. 7, 8 and 9 may be provided with anisotropy that offsets the reaction flux of the armature reaction of an electric rotating machine such as the rotating machine of the present invention. In FIG. 7, both end surfaces 11a are cut, while in FIG. 8, both end portions 11 of the permanent magnet 8 for a bilateral rotating machine are cut in order to provide them with anisotropy, respectively. In FIG. 9, the air gap length at both end portions of the permanent magnet 8 is expanded and the center of the outer diameter is different from that of the inner diameter.

Figure 10:
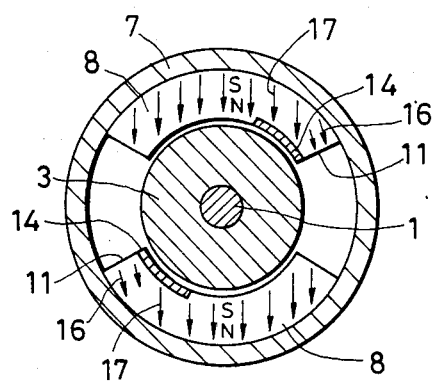

In a field system permanent magnet equipped with a magnetic sheet, such as a soft iron sheet 14 having high permeability, on the demagnetizing side inside the permanent magnet 8 facing the armature core 3 as shown in FIG. 10, demagnetization resistance of the permanent magnet can be further improved by providing the magnet with anisotropy according to the present invention.

Figure 11:
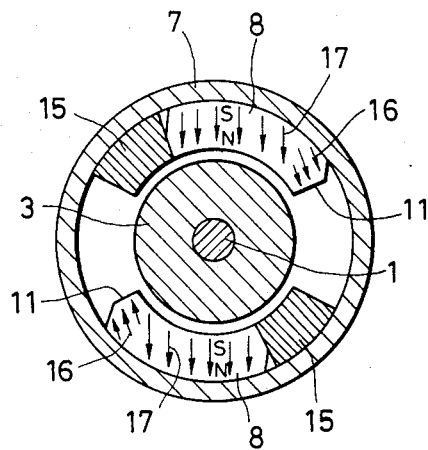

FIG. 11 shows a permanent magnet field system D.C. rotating machine equipped with auxiliary poles, which has a construction wherein a field pole is disposed on the inner periphery of the yoke 7 by the permanent magnet 8 and auxiliary poles made of a magnetic material and acting upon the magnetization of the armature reaction. The effect of the present invention will remain the same if the anisotropy of the end portion 11 on the demagnetizing side of the permanent magnet 8 of this field pole is the same as that of the present invention. In a composite permanent magnet consisting of a high coersive force portion and a high residual flux density portion, the end portion on the demagnetizing side of the high coercive force portion may be provided with anisotropy so as to offset the armature reaction as in the present invention.

Though the description given above illustrates an example wherein an anisotropic magnet having at least two magnetizing directions are disposed in the same pole, the present invention is not particularly limited therto. For example, it is also possible to employ the arrangement wherein two anisotropic magnets each having at least two magnetizing directions are produced separately and are arranged adjacent to each other.

In accordance with the present invention described above, the direction of anisotropy in the magnetizing direction of the end portion of the permanent magnet on the demagnetizing side is set in a direction which offsets the reaction flux, and the demagnetization resistance of the permanent magnet can be improved. Therefore, the thickness of the permanent magnet can be reduced as described above, and a compact, light-weight rotating machine can be produced economically.

The magnetic flux leaks from the end portion on the demagnetizing side to the yoke at the time of no-load where the armature reaction is small; the effective flux incident to the armature core can be reduced relatively, when compared with the prior art apparatuses. Therefore, the no-load number of revolutions can be improved by about 15% if $\theta_A + \theta_B + \theta_C = 63$, and the angle of $\theta_C$ at this time is 10°.

What is claimed is:

1. In a miniature electric non-uniform magnetization rotating machine including a rotor and a stator equipped with at least one field pole disposed on a peripheral circle of said rotor, the improvement wherein said at least one field pole includes one permanent magnet having a length extending in an axial direction of said rotor, said permanent magnet comprising an anisotropic magnet having a magnetizing side and a demagnetizing side having end portions extending in the axial direction of said rotor, said anisotropic magnet having two magnetizing directions arranged such that a first anisotropic direction extends transversely at a predetermined angle to a surface of one end portion on said demagnetizing side along substantially the entire length of said surface, and a second anisotropic direction on both said magnetizing and demagnetizing sides which extends towards the center of said rotor.

2. A miniature electric non-uniform magnetization rotating machine as defined in claim 1, wherein said permanent magnet consists of an anisotropic permanent magnet having a portion on said magnetizing side, an intermediate portion on said demagnetizing side and said end portion on said demagnetizing side adjacent to said intermediate portion on said demagnetizing side, and wherein the magnetizing direction of said end portion on the demagnetizing side is different from the magnetization direction of said portion on the magnetizing side and said intermediate portion on the demagnetizing side.

3. A miniature electric non-uniform magnetization rotating machine as defined in claim 2, wherein the first anisotropic direction of said end portion of said permanent magnet on said demagnetizing side is set at one of a right angle, an acute angle and an obtuse angle to said surface of said one end portion on said demagnetizing side of said permanent magnet and the second anisotropic direction of said portion on said magnetizing side and said portion on said demagnetizing side extends toward the center of said rotor.

4. A miniature electric non-uniform magnetization rotating machine as defined in claim 2, wherein said field pole includes an auxiliary pole made of a magnetic material disposed adjacent to said permanent magnet.

* * * * *